(12) United States Patent
Sacco

(10) Patent No.: US 11,095,807 B2
(45) Date of Patent: Aug. 17, 2021

(54) METHOD AND APPARATUS FOR THE CORRECTION OF GEOMETRIC AND DEPTH OF FIELD PROBLEMS DURING IMAGE TAKING

(71) Applicant: Giovanni Sacco, Turin (IT)

(72) Inventor: Giovanni Sacco, Turin (IT)

(*) Notice: Subject to any disclaimer, the term of this patent is extended or adjusted under 35 U.S.C. 154(b) by 0 days.

(21) Appl. No.: 16/255,279

(22) Filed: Jan. 23, 2019

(65) Prior Publication Data

US 2020/0236289 A1    Jul. 23, 2020

(51) Int. Cl.
*H04N 5/232*    (2006.01)

(52) U.S. Cl.
CPC ... *H04N 5/232125* (2018.08); *H04N 5/23216* (2013.01); *H04N 5/23296* (2013.01); *H04N 5/232939* (2018.08)

(58) Field of Classification Search
CPC ....... H04N 5/212125; H04N 5/232939; H04N 5/23216; H04N 5/23296
See application file for complete search history.

(56) References Cited

U.S. PATENT DOCUMENTS

| | | | | |
|---|---|---|---|---|
| 2002/0161280 A1* | 10/2002 | Chatenever | ............ | A61B 1/042 600/112 |
| 2007/0014551 A1* | 1/2007 | Fujisawa | ............... | G03B 37/02 396/20 |
| 2008/0021271 A1* | 1/2008 | Pasero | ............... | A61B 1/00039 600/109 |
| 2016/0255265 A1* | 9/2016 | Kim | .................... | H04N 5/23206 348/211.2 |
| 2017/0180618 A1 | 6/2017 | Georgiev et al. | | |
| 2018/0321161 A1* | 11/2018 | Okada | .................... | G01N 21/88 |
| 2019/0285967 A1* | 9/2019 | Himei | .................. | G02B 27/646 |
| 2020/0077027 A1* | 3/2020 | Onaka | ............... | H04N 5/23296 |

FOREIGN PATENT DOCUMENTS

GB          1196          5/1904

OTHER PUBLICATIONS

Merklinger, Harold M., "Scheimpflug's Patent," Photo Techniques, Nov./ Dec. 1996.

\* cited by examiner

*Primary Examiner* — Antoinette T Spinks
(74) *Attorney, Agent, or Firm* — Nixon & Vanderhye

(57) ABSTRACT

An imaging equipment includes an image display; an image sensor; a motor; and an inclinometer, where the image display concurrently displays the image being captured by the image sensor, the motor automatically rotates the image sensor around the center of the motor with respect to at least one of the image sensor's axes, to make the sensor level on the basis of data acquired from a inclinometer, the motor allows the user to control the motor to shift the image sensor along at least one of the image sensor's axes, and the motor allows the user to control the motor to rotate the image sensor with respect to at least one of the image sensor's axes to have the motor tilt and swing the image sensor in such a way as to move two or more points, selected by the user, to lie on a same focus plane.

6 Claims, 3 Drawing Sheets

METHOD AND APPARATUS FOR THE CORRECTION OF GEOMETRIC AND DEPTH OF FIELD PROBLEMS DURING IMAGE TAKING

BACKGROUND OF THE INVENTION

Field of the Invention

The invention is directed to imaging equipment, and includes a method and apparatus for the automatic leveling of the images, perspective control, and depth of field control from imaging equipment that have an image sensor.

Description of the Related Art

Current imaging equipment, for example smartphone cameras, digital still or video cameras, etc., feature an image sensor coupled to a processor that can perform calculations, a volatile memory area and a permanent memory area that can store data. Many of these cameras have an image display that shows the image concurrently captured by the sensor in real time, rather than relying on optical viewfinders.

Some of these cameras also support image stabilization by moving the image sensor as to null the effect of camera shake caused by user movements. Sensor movements are very limited and targeted to image stabilization only.

Recent cameras often have a touch-sensitive display that it is often used to set a point on the scene that must be in focus, so as to make autofocusing more precise. Recent lenses report to the imaging equipment the current focusing distance.

Some cameras also include an electronic level or inclinometer which emulates a normal air-bubble level and provides the user with visual cues in order to have the camera on level.

If the camera is not level, geometric distortions can occur such as a titled horizon or a keystoning effect, i.e. a square looks like a trapezoid.

To avoid these problems, the imaging equipment is traditionally placed on a tripod and the tripod head adjusted as to insure the camera is level. However, in most cases, and often when a videocamera is used, a tripod cannot be used.

It would be greatly advantageous that the camera itself automatically operates in such a way as to avoid geometric distortions. Fast-reacting and precise motors would also substitute elaborate, expensive and cumbersome equipment such as gimbals, for videographers.

In addition, especially in architectural imaging, it would be desirable that perspective control would be available. Finally, it would be desirable, especially for product photography, to have control on the focus plane, in order to select the best depth of field for the image.

See also:

Scheimpflug, Theodor. 1904. *Improved Method and Apparatus for the Systematic Alteration or Distortion of Plane Pictures and Images by Means of Lenses and Mirrors for Photography and for other purposes;*

GB Patent No. 1196. Filed 16 Jan. 1904, and issued 12 May 1904; and

Method And Apparatus For Computational Scheimpflug Camera US 20170180618 A1

BRIEF SUMMARY OF THE INVENTION

The invention uses an apparatus that includes a processor-controlled motor that allows sensor rotation around the sensor center with respect to the y and z axes (defined in FIG. 1), and, optionally, the x axis, and, in some embodiments, shift the sensor with respect to the x or y axis, or both. The apparatus also includes an electronic level. Such an electronic level reports the camera orientation (portrait or landscape) and the current angle of the y and z axes with respect to the level. When both angles are zero (0), the camera is level. When one of these angles is non-null (not zero), geometric image problems arise, and the apparatus and method of the invention corrects them. These problems include a tilted horizon and vertical perspective distortions, especially in buildings, called keystoning.

While the first two problems can be mitigated or solved by using a tripod and adjusting the camera according to the electronic level feedback, they remain outstanding for the user that shoots handheld and, most importantly, for video productions. The present invention uses the motor to rotate the sensor as to keep the image level.

Image sensor movements also allow to implement, with a normal lens, the functionalities offered by specialized and expensive perspective-control lenses (PCL).

Shifts are used in PCL to correct perspective by shifting the lens up/down/left/right with respect to the image sensor. All these movements are currently supported mechanically in the lens itself, which is therefore large, heavy and very expensive. In the present invention, instead, all these movements are supported by sensor linear movements (shifts, along the x and y axes) and any normal (non-perspective control) lens can be used. The lens used should have a circle of coverage sufficiently large as to accommodate shifts without vignetting.

Additionally, the movements of the sensor with respect to the three axes (x, y and z) can implement the selection of the most advantageous focus plan, according to the Scheimpflug principle. This feature is especially useful in product photography, but it can be used more generally, and also to produce special effects.

Although the invention described here can be applied to cameras with optical finders, it is best applied to cameras with a real time image display, also called live-view.

DESCRIPTION OF THE PREFERRED EMBODIMENTS

Figure 1:
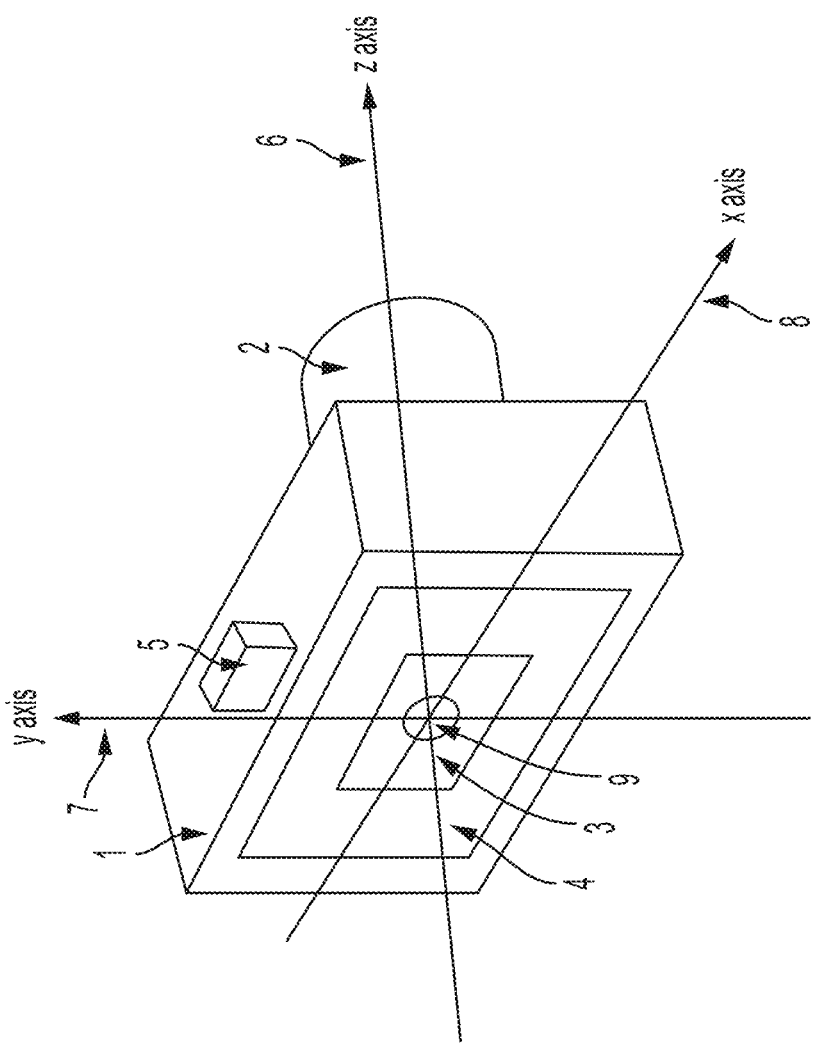
FIGS. 1-4 show an example embodiment of the present invention.

FIG. 1 shows an example of imaging equipment, for example, a camera (1) with a lens (2).

The image sensor (3) captures the image and said capture is concurrently shown on the image display (4), and/or in an electronic view finder (5).

The camera includes an electronic level or inclinometer and computing hardware, which may be placed anywhere in the camera, together or separately.

For the purpose of explanation, three Cartesian axes are defined. The origin of these axes is the center of the image sensor (3).

The z axis (6) connects the origin with the center of the lens, the y axis (7) is parallel to the left (or right) side of the sensor, and the x axis (8) is parallel to the top (or bottom) side of the sensor.

The camera also has a processor-controlled motor (9) which can rotate the sensor with respect to the y and z axis and optionally the x axis, and, in some embodiments, shift the sensor with respect to the x or y axis, or both.

Figure 2:
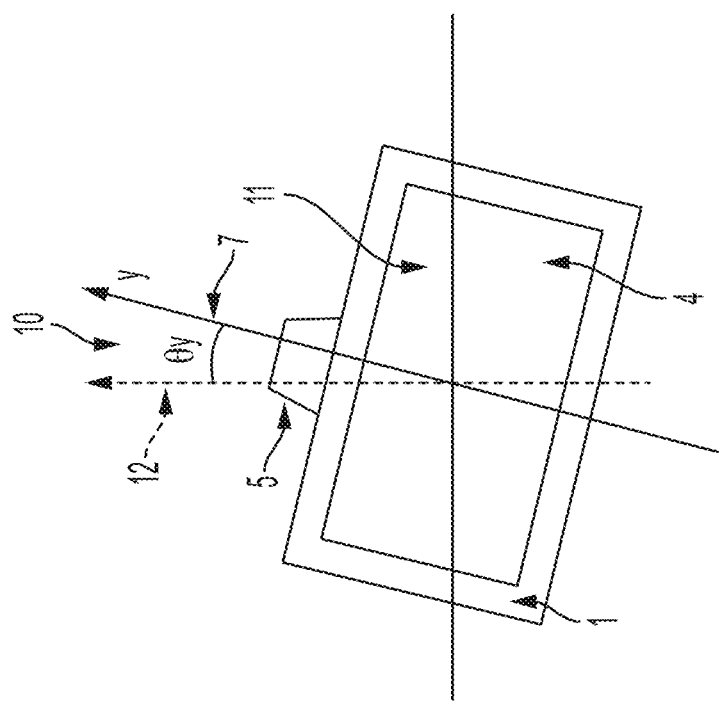

FIG. 2 shows a camera tilted with respect to the y axis (7), and level with respect to the z axis, and so producing a tilted horizon (11). The dotted axis (12) indicates the level y axis. The angle θy (10) is with respect to the level y axis (7), and is therefore a positive value in the figure.

Figure 4:
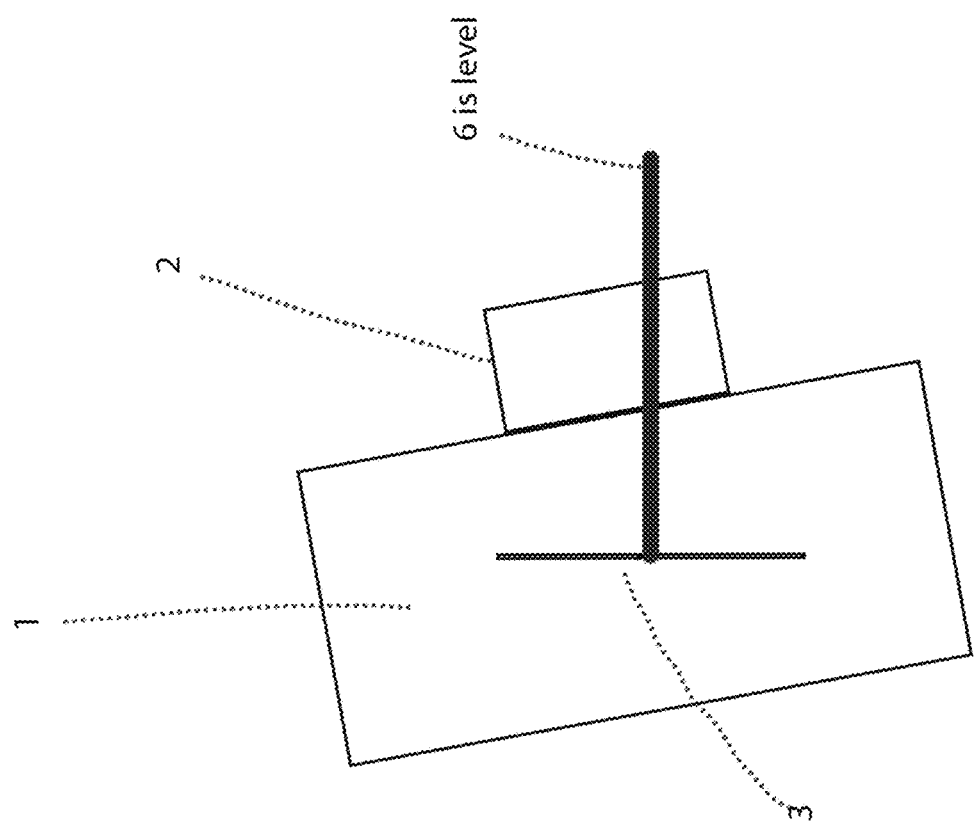
Figure 3:
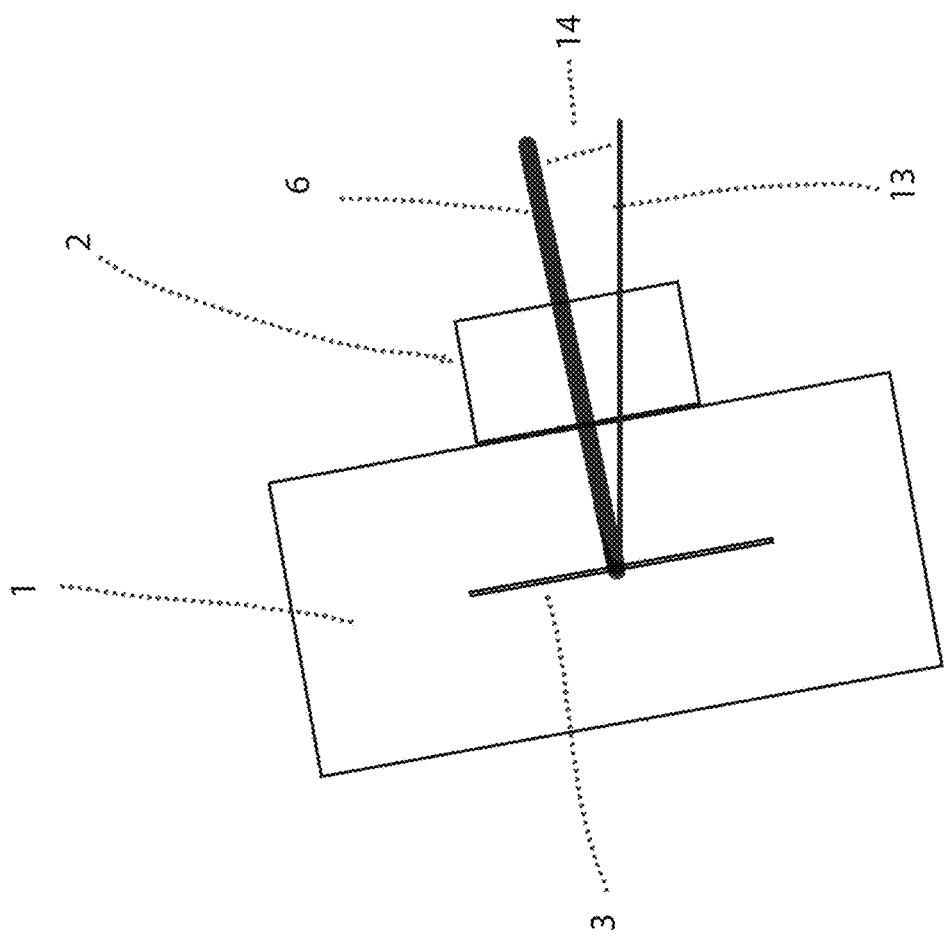

FIG. 3 shows a camera tilted by an angle θz (14) with respect to the level z axis (13). As discussed below, if θz is not null, the camera is not level, i.e., pointing straight but it points either upwards or downwards. The scene is vertically tilted, making a square look like a trapezoid, with the shorter side either up or down depending on whether the camera points upwards or downwards (vertical keystoning). In FIG. 3, the camera is tilted by a negative angle θz (14) with respect to the level z axis (13). In the invention, to correct the tilt, the motor rotates the image sensor with respect to the z axis by +θz degrees as shown in FIG. 4 so that the image sensor is at a null angle θz (14) with respect to the level z axis (13).

The description of the preferred embodiments refers to the camera in a landscape orientation, since the description for the portrait orientation is the same with the y and x axes interchanged. The preferred embodiment can be applied to any imaging equipment.

The electronic level reports the angle θy and θz, which reports the deviation of the y and z axis, respectively, from level. These angles can be positive, negative or null (zero).

I. Camera Rotation with Respect to the y Axis (Tilted Horizon):

if θy is not null, the camera is not level and the horizon is tilted. To correct the tilt, the motor rotates the images sensor with respect to the y axis by −θy degrees. Such a correction is done continuously on the basis of the output of the electronic level.

II. Camera Rotation with Respect to the z Axis (Vertical Keystoning):

if θz is not null, the camera is not level, i.e. pointing straight but it points either upwards or downwards. The scene is vertically tilted, making a square look like a trapezoid, with the shorter side either up or down depending on whether the camera points upwards or downwards (vertical keystoning).

To correct the tilt, the motor rotates the image sensor with respect to the z axis by +θz degrees. Compare FIGS. 3-4.

The two corrections are done continuously on the basis of the output of the electronic level. In a preferred embodiment, corrections can be excluded in order to allow for intentional tilts. In another embodiment, corrections can be automatically excluded when the camera is not capturing stills or video, as to save power. In yet another embodiment, corrections can be applied at the shutter button half press.

III. Sensor Shift for Perspective Control

Especially when photographing architecture and in particular high buildings, the camera must usually be tilted with respect to the z axis, in order to capture the entire building in the image. This, however, produces a vertical keystoning. On the other hand, if the camera is kept level, only the bottom part of the building will usually be captured.

In order to overcome these problems, the sensor can be shifted along the y axis in such a way that the bottom of the building moves towards the bottom of the image, and a larger portion of the building is captured by the sensor.

The sensor can be continuously shifted up and down (on the y axis), or left and right (on the x axis) by the user, until a specified threshold that usually depends on the lens circle of coverage. In a preferred embodiment, shifts are controlled through one or two controls, either physical controls or virtual ones on the display. The image display itself gives a concurrent feedback on the effect on perspective control of the current shift. Because shifts are primarily used for perspective control, a preferred embodiment forces the sensor to be level.

IV. Sensor Swing for Eliminating Horizontal Keystoning.

Horizontal keystoning (a square looks like a trapezoid with the smaller side either on right or on the left) occurs when the sensor is not perfectly parallel to the scene. This problem can be corrected by rotating the sensor with respect to the x axis until the horizontal keystoning disappears. Since the inclinometer by itself is unable to determine the angle of deviation from parallel, in one embodiment the rotation is manually applied through physical or virtual controls.

In another embodiment, in which lenses report the focusing distance from the sensor plane, the user selects two (or more) points on the image that should be at the same distance from the sensor plane, and the camera automatically computes the angle of rotation around the x axis.

V. Combination of Movements for Varying the Focus Plane

When no tilt (rotation with respect to the z axis) or swing (rotation with respect to the x axis) movements are applied to the sensor, the focus plane (i.e. the plane on which all points are in focus) is parallel to the sensor.

Tilt and swing movements, however, can be used to have a focus plane that is not parallel to the sensor, and in which objects whose distance from the imaging equipment is different lie in fact on the same focus plane, and are therefore in focus at the same time. The focus plane, as a function of tilt and swing angles, varies according to the Scheimpflug principle.

An embodiment lets the user vary the tilt and swing angles manually, until the focus plane is satisfactorily placed.

In a preferred embodiment, the user selects two or more points that should lie on the desired focus plane, and the imaging equipment computes the correct (or best possible) tilt and swing angles according to the Scheimpflug principle, and automatically applies them.

In all situations in which points must be selected on the image, a variant allows the selection of points through a touch-sensitive display, and another variant allows this operation performed on larger displays, working in tethering with the imaging equipment.

Although only a few embodiments have been disclosed in detail above, other embodiments are possible and the inventors intend these to be encompassed within this specification.

The specification describes specific examples to accomplish a more general goal that may be accomplished in another way. This disclosure is intended to be exemplary, and the claims are intended to cover any modification or alternative which might be predictable to a person having ordinary skill in the art. For example, the methods can be applied to other search and data management applications.

Those of skill would further appreciate that the various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

Secondary storage defines generic storage devices (including main memory) that maintain information that the computer can access, and may use any type of technology for this purpose.

The previous description of the disclosed exemplary embodiments is provided to enable any person skilled in the art to make or use the present invention.

Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for the perspective control of images from an imaging equipment having an inclinometer, an image sensor that captures an image, an image display that concurrently displays the image captured by the image sensor, and a motor that moves the image sensor, three Cartesian axes being defined by a y axis, an x axis, and a z axis that intersect at a center of the image sensor, the method comprising the steps of:

having the inclinometer measure and report an angle theta[z] of the image sensor's z axis with respect to a level orientation of the image sensor and concurrently having the image display display the image captured by the image sensor;

based on the report of the angle theta[z], having the motor make a correction by rotating the image sensor around the center of the motor with respect to the image sensor's z axis, by the motor rotating the image sensor by an angle of minus theta[z] to thereby reduce the angle theta[z] of the image sensor's z axis to a zero value, said correction by said motor rotation leveling the image thereby avoiding a keystoning effect in the image; and controlling the motor to move the image sensor linearly along at least one of the image sensor's y axis and x axis, the linear movement along the y axis being up to a first specified threshold along the y axis and the linear movement along the x axis being up to a second specified threshold along the x axis, said linear movement along at least one of the image sensor's y axis and x axis reducing or avoiding a need to tilt the imaging equipment in order to capture a portion of interest in the scene.

2. The method of claim 1, wherein in said step of controlling the motor to move the image sensor linearly along at least one of the image sensor's y axis and x axis respectively linearly along the y axis up to the first specified threshold and linearly along the x axis up to the second specified threshold, said first and second specified threshold can be continuously set by a user.

3. The method of claim 1, wherein in said step of making the correction by having the motor rotate the image sensor around the center of the motor with respect to the image sensor's z axis, the user excludes the correction in order to allow for intentional tilting.

4. The method of claim 1, further comprising:

having the inclinometer that measure and report an angle theta[y] of the image sensor's y axis with respect to a level orientation of the image sensor, and based on the report of the angle theta[y], having the motor make a further correction by rotating the image sensor around the center of the motor with respect to the image sensor's y axis by an angle of minus theta[y] to thereby reduce the angle theta[y] of the image sensor's y axis to a zero value to bring the sensor to horizon level.

5. The method of claim 1, further comprising:

having the motor make a further correction by rotating the image sensor around the center of the motor with respect to the image sensor's x axis to bring the sensor parallel to the scene, said further correction by said motor rotation bringing the sensor parallel to the scene thereby avoiding a horizontal keystoning effect in the image.

6. The method of claim 4, further comprising:

having the motor make a further correction by rotating the image sensor around the center of the motor with respect to the image sensor's x axis to bring the sensor parallel to the scene, said further correction by said motor rotation bringing the sensor parallel to the scene thereby avoiding a horizontal keystoning effect in the image.

* * * * *